US011842343B2

(12) United States Patent
Dragiff et al.

(10) Patent No.: US 11,842,343 B2
(45) Date of Patent: *Dec. 12, 2023

(54) SYSTEMS AND METHODS FOR AUTHENTICATING AND PROVIDING PAYMENT TO A SUPPLIER

(71) Applicant: SunGard AvantGard LLC, Wayne, PA (US)

(72) Inventors: Matthew Dragiff, Jacksonville, FL (US); James English, Middleburg, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/843,568

(22) Filed: Apr. 8, 2020

(65) Prior Publication Data
US 2020/0234289 A1 Jul. 23, 2020

Related U.S. Application Data

(63) Continuation of application No. 16/796,092, filed on Feb. 20, 2020, which is a continuation of application
(Continued)

(51) Int. Cl.
G06Q 20/38 (2012.01)
G06Q 20/12 (2012.01)
(Continued)

(52) U.S. Cl.
CPC ........... G06Q 20/385 (2013.01); G06Q 20/12 (2013.01); G06Q 20/401 (2013.01); G06Q 20/10 (2013.01);
(Continued)

(58) Field of Classification Search
None
See application file for complete search history.

(56) References Cited

U.S. PATENT DOCUMENTS 5,163,098 A * 11/1992 Dahbura ............... H04L 9/3234
705/75
5,903,878 A 5/1999 Talati et al.
(Continued)

OTHER PUBLICATIONS

Wright express announces international capabilities for single-use virtual payments. (Nov. 3, 2011). Business Wire Retrieved from https://dialog.proquest.com/professional/docview/1073095635?accountid=131444 on Jun. 30, 2023 (Year: 2011).*
(Continued)

Primary Examiner — Kito R Robinson
(74) Attorney, Agent, or Firm — Finnegan, Henderson, Farabow, Garrett & Dunner, LLP

(57) ABSTRACT

An authentication and payment system for paying a supplier via a network may include a non-transitory computer readable storage medium having program logic stored thereon having a code for an authentication and payment application executable by a processor of a computing device. The code may be programmed to perform a step of receiving a first set of specific data elements from a payer regarding an authorized purchase by the payer from the supplier. The code may be further programmed to receive a second set of specific data elements from the supplier. If the first set of specific data elements matches at least a portion of second set of specific data elements, the code may be programmed to generate and send a single-use number to the supplier. The single-use number may be usable as a credit card number for only one purchase.

18 Claims, 8 Drawing Sheets

Related U.S. Application Data

No. 14/304,492, filed on Jun. 13, 2014, now Pat. No. 10,592,900.

(51) Int. Cl.
    *G06Q 20/40*     (2012.01)
    *G06Q 20/14*     (2012.01)
    *G06Q 40/12*     (2023.01)
    *G06Q 20/10*     (2012.01)
    *G06Q 40/02*     (2023.01)

(52) U.S. Cl.
    CPC ........... *G06Q 20/108* (2013.01); *G06Q 20/14* (2013.01); *G06Q 20/382* (2013.01); *G06Q 20/40* (2013.01); *G06Q 20/405* (2013.01); *G06Q 40/02* (2013.01); *G06Q 40/12* (2013.12)

(56) References Cited

U.S. PATENT DOCUMENTS

| | | | |
|---|---|---|---|
| 6,163,771 A * | 12/2000 | Walker | G06Q 20/04 705/18 |
| 6,226,624 B1 | 5/2001 | Watson et al. | |
| 8,011,593 B2 | 9/2011 | Preta et al. | |
| 8,825,532 B1 * | 9/2014 | Wong | G06Q 20/386 235/382 |
| 2002/0013900 A1 | 1/2002 | Ibuki | |
| 2004/0215573 A1 | 10/2004 | Teutenberg et al. | |
| 2005/0080692 A1 | 4/2005 | Padam et al. | |
| 2005/0182648 A1 | 8/2005 | Shaw et al. | |
| 2005/0216424 A1 | 9/2005 | Gandre et al. | |
| 2006/0161435 A1 | 7/2006 | Atef et al. | |
| 2009/0006253 A1 * | 1/2009 | Bresnan | G06Q 20/102 705/40 |
| 2009/0125430 A1 | 5/2009 | Krueger | |
| 2009/0259560 A1 | 10/2009 | Bachenheimer | |
| 2010/0185544 A1 * | 7/2010 | Adiseshann | G06Q 20/32 455/414.1 |
| 2010/0276484 A1 | 11/2010 | Banerjee et al. | |
| 2011/0035294 A1 * | 2/2011 | Mizrah | G06Q 20/389 705/26.42 |
| 2011/0131104 A1 | 6/2011 | Rose et al. | |
| 2012/0030115 A1 | 2/2012 | Peace et al. | |
| 2012/0239572 A1 | 9/2012 | Wolfs et al. | |
| 2013/0006848 A1 | 1/2013 | Kuttuva | |
| 2013/0060686 A1 | 3/2013 | Mersky | |
| 2013/0085938 A1 * | 4/2013 | Stone | G06Q 20/3255 705/41 |
| 2013/0282588 A1 | 10/2013 | Hruska | |
| 2014/0223573 A1 * | 8/2014 | Reedy | H04L 63/0428 726/26 |
| 2015/0206143 A1 | 7/2015 | Kurian | |
| 2015/0278811 A1 | 10/2015 | Lalchandani et al. | |
| 2016/0086171 A1 | 3/2016 | Rehe et al. | |

OTHER PUBLICATIONS

Kuykendall, L. (Jun. 4, 2001). Single-use card number clicks with microsoft will computer giant hit 'dinosaurs' with system they snubbed? American Banker Retrieved from https://dialog.proquest.com/professional/docview/249843823?accountid=131444 on Jun. 30, 2023 (Year: 2001).*

Maestro readies A global internet debit solution. (2001). ATM & Debit News, 1. Retrieved from http://dialog.proquest.com/professional/docview/677721296?accountid=142257 on Oct. 22, 2019 (Year: 2001).

\* cited by examiner

Fig. 4

SYSTEMS AND METHODS FOR AUTHENTICATING AND PROVIDING PAYMENT TO A SUPPLIER

CROSS-REFERENCE TO RELATED APPLICATIONS

This application claims priority to U.S. application Ser. No. 16/796,092, filed on Feb. 20, 2020, currently pending, which claims priority to U.S. patent application Ser. No. 14/304,492, filed Jun. 13, 2014, which issued as U.S. Pat. No. 10,592,900 on Mar. 17, 2020. The contents of the above-referenced applications are hereby incorporated by reference in their entireties.

BACKGROUND

Historically, business-to-business payments ("B2B payments") have been executed by printing and mailing checks or by processing payments over the ACH or Wire settlement networks. Increasingly, however, B2B payments are made by virtual credit card-based solutions, in part due to rebates offered by credit card issuers. Suppliers who receive a virtual card number for invoice payment process them just as they would process any other card-not-present transaction (e.g., a credit card number received via phone call or via an e-commerce web site). Suppliers enter the card number, expiration date, security code and amount on their merchant terminal or point-of-sale (POS) terminal, and the card payment is authorized and settled just like any other credit card.

While virtual credit card-based B2B payments offer benefits to payers, distribution of virtual credit card numbers creates certain security risks if such numbers are distributed to unauthorized users. Specifically, using virtual credit card-based B2B payments presents a challenge in terms of authenticating the recipient of the card. To address this security risk, current credit card-based B2B payment systems require suppliers to authenticate themselves by pre-registering with a third-party payment processor. This pre-registration process is directed to authorizing the supplier to receive credit card-based payments for all purchases, rather than authorizing only a specific purchase. For this reason, the pre-registration process does not take into account details associated with specific purchases. Instead, the pre-registration process identifies contact information, user preferences, and/or other details generally applicable to the suppliers.

Separate pre-registration and payment processes provides for authenticating the recipient of a virtual credit card and minimizes security risks associated with delivering credit card information to the supplier. For suppliers that frequently receive payments, such pre-registration processes efficiently manage security risks.

SUMMARY

The pre-registration systems described above fail to appreciate an esoteric problem associated with pre-registering suppliers who are "one-time" suppliers or who are paid very infrequently. The inventors of the present disclosure uniquely appreciated that, for one-time suppliers or for suppliers who are paid very infrequently, a pre-registration system is inefficient for managing security risks.

The present disclosure addresses this esoteric problem. In contrast to payment systems that require separate pre-registration process and payment processes, the present disclosure authenticates a recipient of a virtual credit card, such as a supplier, on a per-purchase basis using confidential information that is available to both the supplier and the payer. The disclosed systems and methods for authentication and payment minimizes the risk of transferring information to an unauthorized user while also addressing the problem associated with payment systems that require a separate pre-registration process. Specifically, the systems and methods described herein do not employ a pre-registration system which, while beneficial for suppliers who frequently receive payments, is problematic for suppliers who are one-time suppliers or who are paid very infrequently.

In some embodiments, an authentication and payment system for paying a supplier via a network may include a non-transitory computer readable storage medium having program logic stored thereon having a code for an authentication and payment application executable by a processor of a computing device. The code may be programmed to perform a step of receiving a first set of specific data elements from a payer regarding an authorized purchase by the payer from the supplier. The first set of specific data elements may include at least two of a first date of service or purchase, a first authorization number, and a first cost. The code may be further programmed to receive a second set of specific data elements from the supplier. The second set of specific data elements may include at least two of a second date of service or purchase, a second authorization number, and a second cost. The code may also be programmed to compare the first set of specific data elements to the second set of specific data elements. If the first set of specific data elements matches at least a portion of second set of specific data elements, the code may be programmed to generate and send a single-use number to the supplier. The single-use number may be usable as a credit card number for only one purchase.

In some embodiments, a method of authenticating and providing payment to a supplier via a network may include receiving, via a computing device, a first set of specific data elements from a payer regarding an authorized purchase by the payer from the supplier. The first set of specific data elements may have at least two of a first date of service or purchase, a first authorization number, and a first cost. The method may further include receiving, via the computing device, a second set of specific data elements from the supplier. The second set of specific data elements may have at least two of a second date of service or purchase, a second authorization number, and a second cost. The method may also include comparing, via the computing device, the first set of specific data elements to the second set of specific data elements. If the first set of specific data elements matches at least a portion of second set of specific data elements, the method may include steps of generating, via the computing device, and sending, via the network, a single-use number to the supplier. The single-use number may be usable as a credit card number for only one purchase.

In some embodiments, a system for authenticating and providing payment to a supplier via a network may include a means for receiving a first set of specific data elements from a payer regarding an authorized purchase by the payer from the supplier. The first set of specific data elements may have at least two of a first date of service or purchase, a first authorization number, and a first cost. The system may also include a means for receiving a second set of specific data elements from the supplier. The second set of specific data elements may have at least two of a second date of service or purchase, a second authorization number, and a second cost. The system may further include a means for comparing the first set of specific data elements to the second set of specific data elements. Additionally, the system may include a means for generating, via the computing device, and a means for sending, via the network, a single-use number if the first set of specific data elements matches at least a portion of second set of specific data elements. The single-use number may be usable as a credit card number for only one purchase.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The following description may be understood when read in conjunction with the appended drawings. For purposes of illustrating the systems and methods of authenticating and providing payment to suppliers disclosed herein, there is shown in the drawings exemplary embodiments thereof. However, the claimed systems and methods are not limited to the specific embodiments disclosed. In the drawings:

Figure 4:
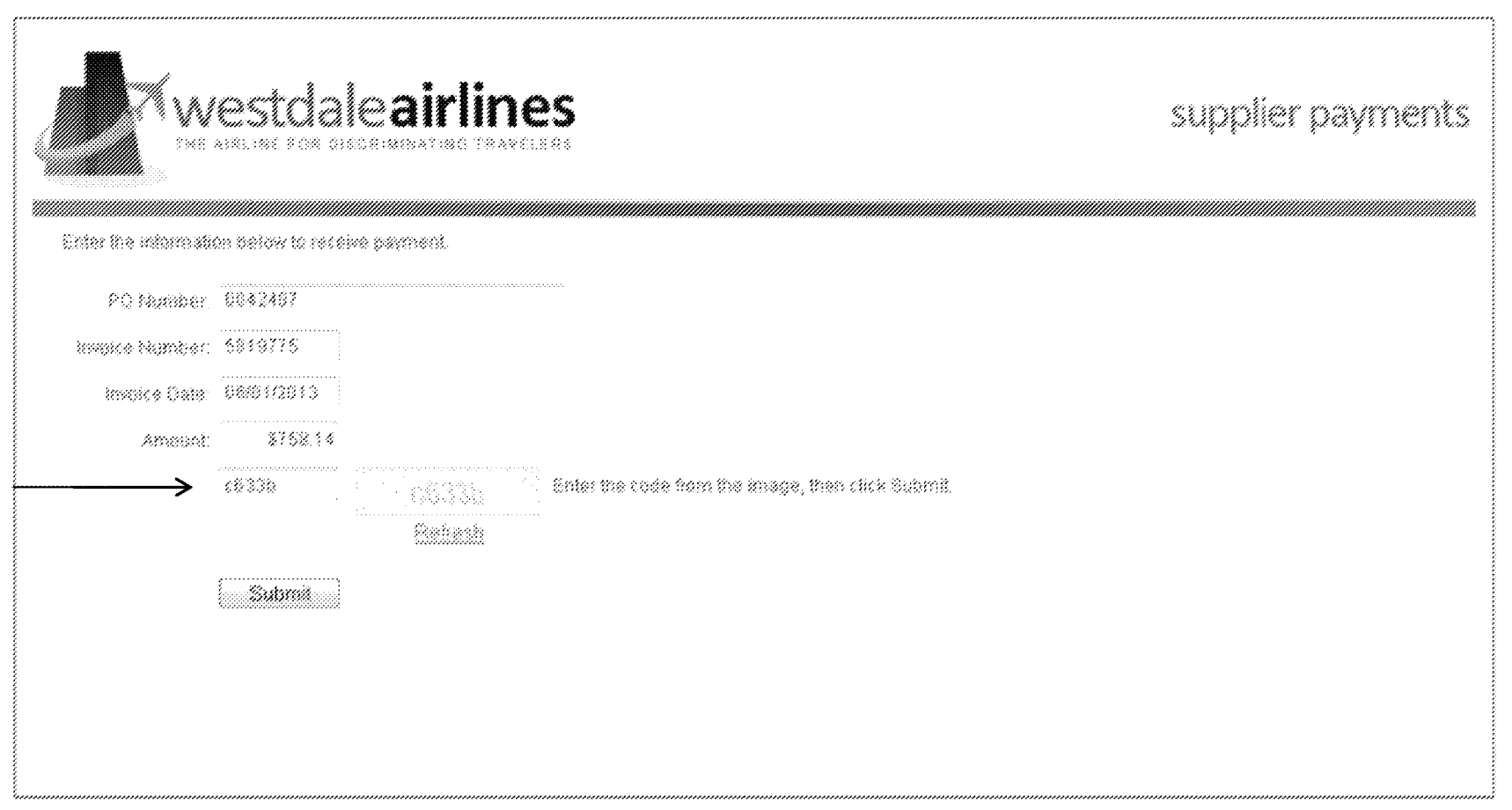

FIG. 4 is an exemplary embodiment of a user interface for a system and method for providing payment to a supplier;

DETAILED DESCRIPTION OF ILLUSTRATIVE EMBODIMENTS

The various aspects of the subject matter described herein are now described with reference to the accompanying drawings, wherein like numerals refer to like or corresponding elements throughout. It should be understood, however, that the drawings and detailed description relating thereto are not intended to limit the claimed subject matter to the particular form disclosed. Rather, the intention is to cover modifications, equivalents, and alternatives falling within the spirit and scope of the claimed subject matter.

Components described below relate to a computer-related entity, either hardware, a combination of hardware and software, software, or software in execution. For example, components may be, but are not limited to being, a process running on a processor, a processor, an object, an executable instruction, a thread of execution, a program, and/or a computer. By way of illustration, both an application running on a computer and the computer may be a component. One or more components may reside within a process and/or thread of execution and a component may be localized on one computer and/or distributed between two or more computers.

Figure 1:
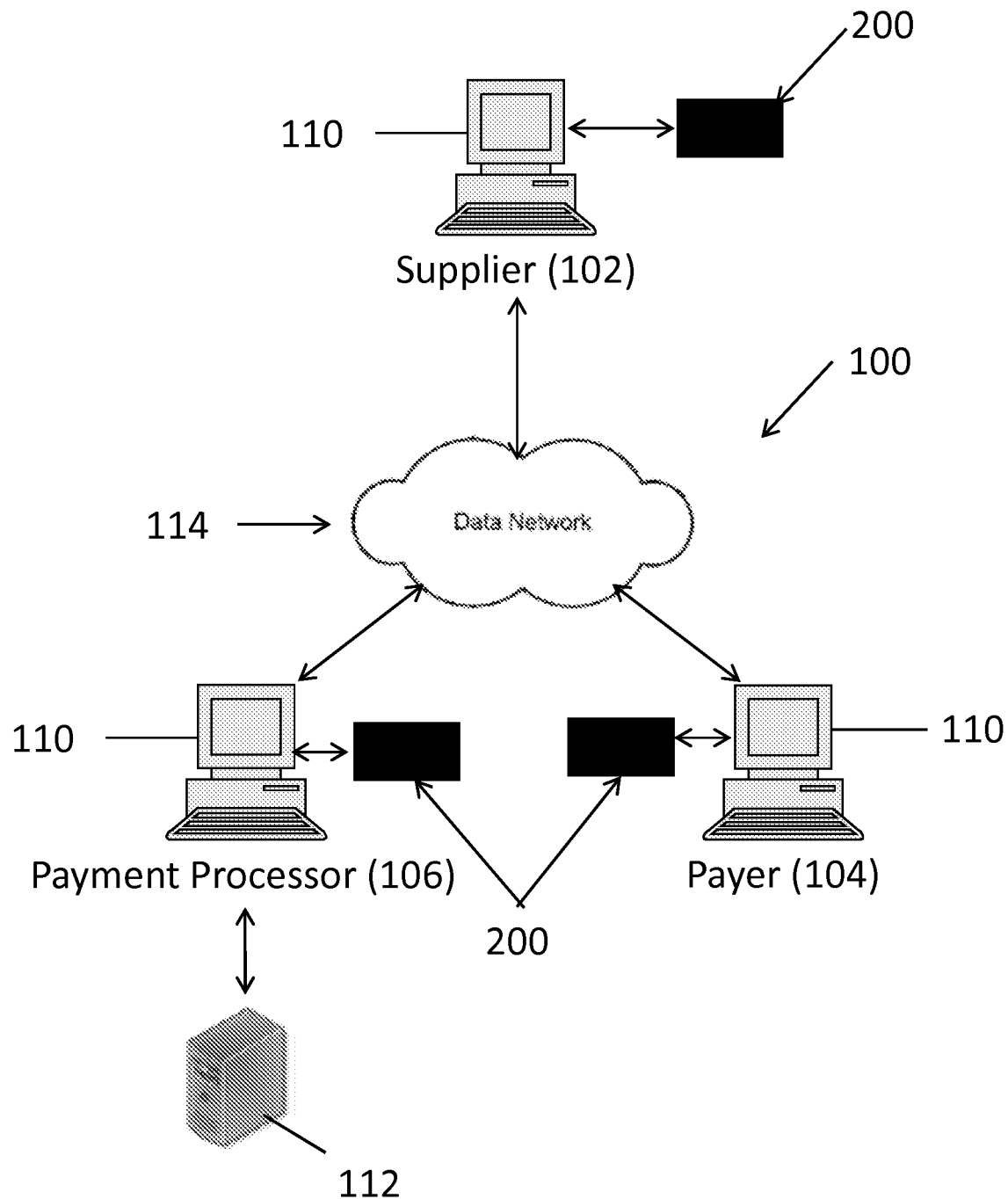
FIG. 1 is a schematic of an exemplary embodiment of a system and method for providing payment to a supplier.

With reference to FIG. 1, the following description relates to a system 100 that includes one or more computing devices 110 and a server 112. Each computing device 110 may comprise any suitable device, examples of which include a desktop computing device, a portable computing device, such as a tablet or laptop, a portable phone (e.g., a cell phone or the like, a smart phone, a video phone), a landline phone, or a combination thereof. Devices 110 may be configured to transmit data between each other via a data network 114. The data network 114 may comprise any public or private data network, including the Internet or an intranet. System 100 may also be implemented using an Interactive Voice Response (IVR) system which would communicate over the Public Switched Telephone Network (PSTN).

Each device 110 is associated with one of a supplier 102, a payer 104, and a payment processor 106. Specifically, supplier 102 accesses device 110a, payer 104 accesses device 110b, and payment processor 106 accesses device 110c. In one example, supplier 102 may be a food caterer. Payer 104 may be an airline. Payment processor 106 may be a third party entity that has contracted with the airline to process payments to its suppliers. As described in detail below with reference to FIGS. 3-5, when the airline makes a food order, the airline, the food caterer, and the third party entity each send and receive information via the data network 114 to process a payment from the airline to the food caterer.

In another example, a supplier 102 may be an automobile repair shop. Payer 104 may be a car leasing company. Payment processor 106 may be the same or a different third party entity as described above that has contracted by the car leasing company to process payments for its suppliers, such as the automobile repair shop. As described in detail below with reference to FIGS. 6-8, when an automobile lessee brings a leased car to the automobile repair shop, the repair shop, the car leasing company, and the third party entity each send and receive information via the data network 114 to process a payment from the car leasing company to the repair shop.

Figure 2:
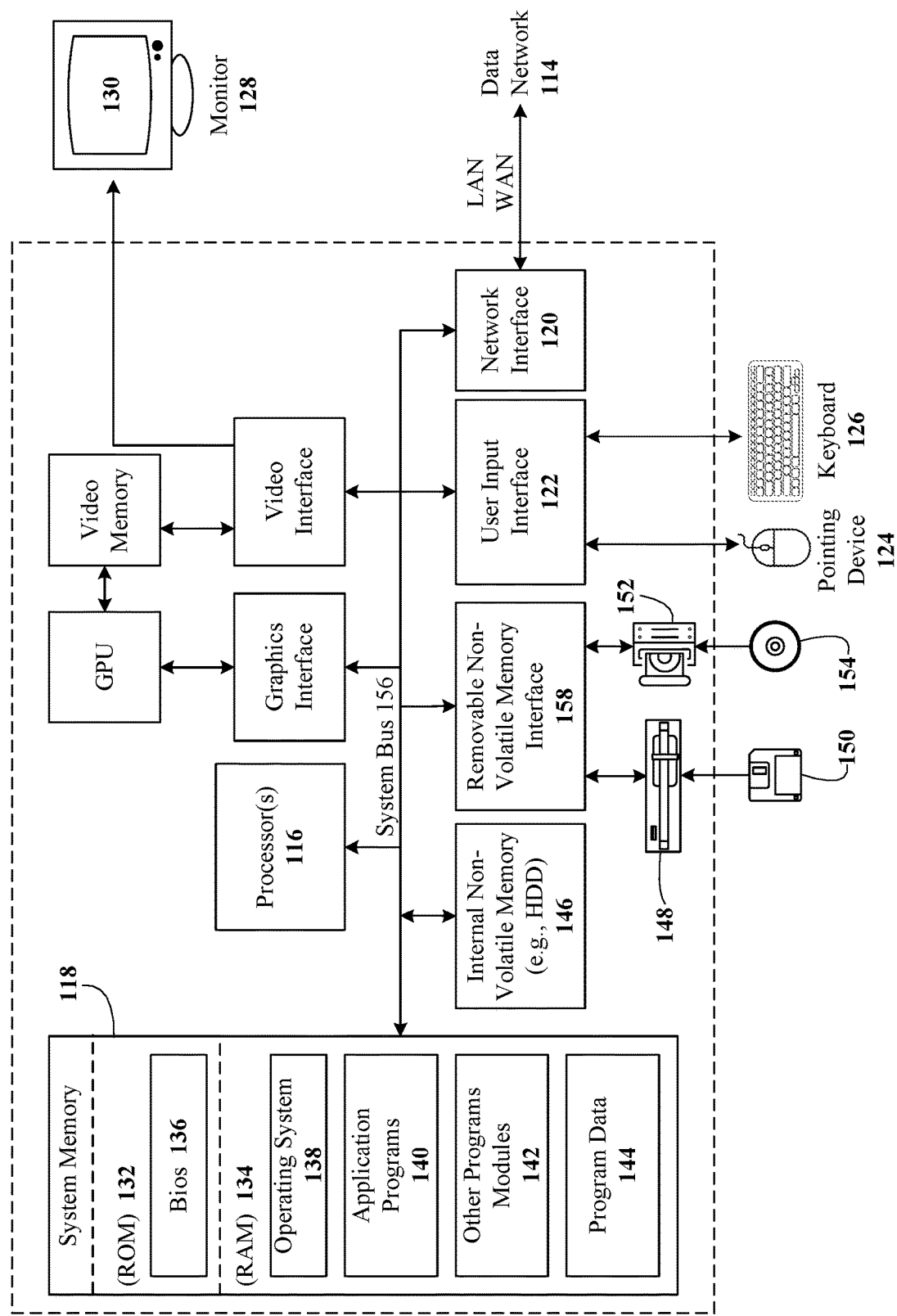
FIG. 2 is a block diagram of one embodiment of a computer system in which aspects of the disclosed systems and methods may be embodied.

With reference now to FIG. 2, each device 110 comprises a processor 116, a memory 118, a network interface 120, and a user input interface 122 that includes a pointing device 124 (such as a mouse, trackball, or touch pad) and keyboard 126. Device 110 also includes a monitor 128 that includes a display 130. Display 130 is configured to show a user interface, such as the user interfaces depicted in FIGS. 4, 5, 7, and 9. Other input devices (not shown) may include a microphone, joystick, game pad, satellite dish, scanner, or the like. These and other input devices may be connected to the processor 116 through the user input interface 122 that is coupled to system bus 156, but may be connected by other interface and/or bus structures, such as a parallel port, game port, or a universal serial bus (USB) for example.

The user input interface 122 of device 110 may provide the ability to control the device 110, via, for example, buttons, soft keys, voice actuated controls, a touch screen, movement of the device 110, visual cues (e.g., moving a hand in front of a camera on the device 110), or the like. The device 110 may provide visual information (e.g., via display 130), audio information (e.g., via a speaker), mechanically (e.g., via a vibrating mechanism), or a combination thereof. The device 110 may comprise means for inputting biometric information, such as, for example, fingerprint information, retinal information, voice information, and/or facial characteristic information. The device 110, such as a smart phone or tablet, may also communicate with an application store via data network 114.

Memory 118 may include computer storage media in the form of volatile and/or nonvolatile memory such as read only memory (ROM) 132 and random access memory (RAM) 134. A basic input/output system 136 (BIOS), containing the basic routines that help to transfer information between elements within device 110, such as during start-up, may be stored in ROM 132. RAM 134 may contain data and/or program modules that are immediately accessible to and/or presently being operated on by processor 116. By way of example, FIG. 2 illustrates an operating system 138, application programs 140, other program modules 142, and program data 144. As a further example, video content (e.g. video frames) and/or metadata (e.g. closed caption data) may be stored in the system memory 118, as well as in any of a variety of nonvolatile memory media discussed herein.

The device 110 may also include other removable/non-removable, volatile/nonvolatile computer storage media. By way of example, the device 110 may include a hard disk drive 146 that reads from or writes to non-removable, nonvolatile magnetic media, a magnetic disk drive 148 that reads from or writes to a removable, nonvolatile magnetic disk 150, and an optical disk drive 152 that reads from or writes to a removable, nonvolatile optical disk 154 such as a CD ROM or other optical media. Other removable/non-removable, volatile/nonvolatile computer storage media that may be used in the exemplary operating environment include, but are not limited to, magnetic tape cassettes, solid-state drives, flash memory cards, digital versatile disks, digital video tape, solid state RAM, solid state ROM, and the like. Magnetic disk drive 148 and optical disk drive 152 may be connected to system bus 156 by a removable memory interface, such as interface 158. The drives and their associated computer storage media discussed herein, and illustrated in FIG. 2, may provide storage of computer readable instructions, data structures, program modules and other data for the device 110. As used herein, the terms "computer-readable medium" and "computer-readable storage medium" may refer either to physical, non-transitory storage media or transitory media, such as signals.

Network interface 120 connects to the data network 114 to transmit data between other devices 110, for example, via the Internet using a LAN/WAN. Processor 116, memory 118, network interface 120, and user input interface 120 cooperate to allow communications therebetween.

System 100 may include an application 200, which is installed on a device 110, such as a device at a supplier 102, a payer 104, or a payment processor 106. The application 200 may comprise computer-executable instructions, or program code, stored on a non-transitory computer readable storage medium within the device 110. The computer-executable instructions of the application 200, when executed by the processor 116 of the device 110, cause the device 110 to perform various authentication functions such as those described in relation to the processes shown in FIGS. 3 and 6. The application 200 may be loaded onto the device 110 either through a wired or wireless connection, such as via a download from a remote storage location, like a server hosting a site with multiple applications.

In one embodiment, application 200 comprises a server application running on one or more computer servers 112 (shown in FIG. 1). Application 200 uses device 110 to communicate with the other devices 110 the data network 114. The server application may be implemented in accordance with any of a variety of different server architectures, such as via one or a combination of network-based hosted services, cloud services, Software as a Service (SaaS), Communications as a Service (CaaS), virtual services, on-demand services, public switched telephone network (PSTN) services or the like.

Figure 3:
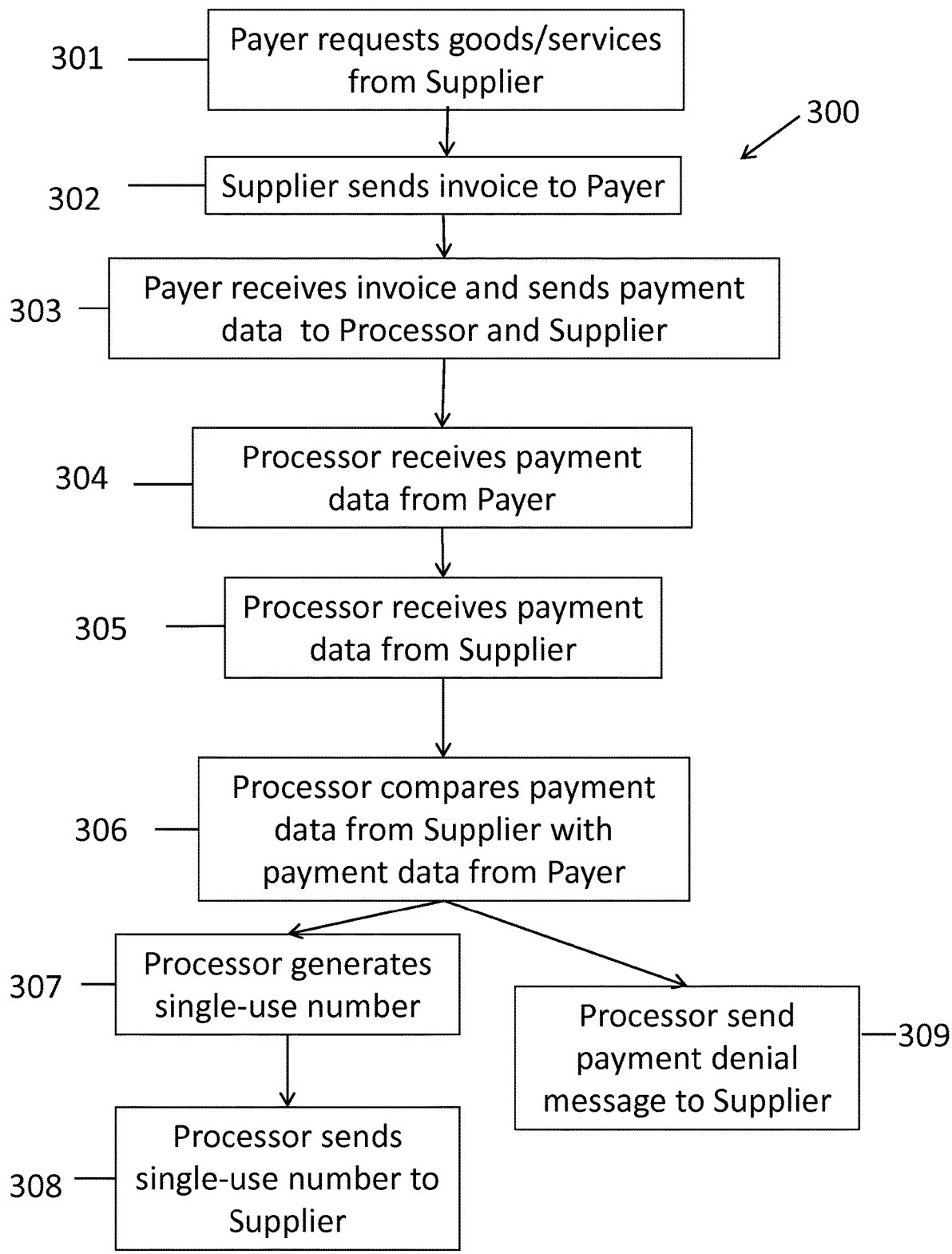
FIG. 3 is a flowchart of a system and method for providing payment to a supplier.

Turning now to FIG. 3, a flow diagram is shown that illustrates an authentication and payment process 300 used by a payment processor 106 to process payments from the payer 104 to the supplier 102. At step 301, a payer 104 sends a request to a supplier 102 to supply goods or services. For example, payer 104 may send a PO transmitted by mail, fax, or email (such as over data network 114), or transmitted via a buyer-supplier network. Alternatively, payer 104 may place an order by phone. Payer 104 may send supplier 102 a first set of specific data elements with the request. The first set of specific data elements may include an authorization number, such as a purchase order ("PO") number that may be generated by the payer 104 and is unique to the purchase for the goods and services rendered. Alternatively, the authorization number could be a different type of number such as a vehicle identification number ("VIN"), an equipment/part serial number, a tax ID, a Duns Number, a Supplier ID, an invoice number, a payment reference Number, a voucher number, a business location ID, a model number, an account number, a provider ID, a claim number, or a vendor ID.

At step 302, supplier 102 sends an invoice to payer 104 for the goods or services rendered. For example, as described above, supplier 102 may be a food caterer and payer 104 may be an airline. The invoice may include an invoice number, generated by the supplier that is unique to the purchase for the goods or services rendered, and distinct from the authorization number. The invoice may also include a date of purchase/service (such as an invoice date), and a cost (or amount). Supplier 102 may send the invoice to payer 104 by mail, email (such as over data network 114), etc.

At step 303, payer 104 receives the invoice, including the invoice number, from the supplier 102. The supplier 102 may be an entity that has never conducted business with payer 104, or who only conducts business with payer 104 on an irregular basis. If supplier 102 has never conducted business with payer 104, or infrequently conducts business with payer 104, the supplier 102 is unlikely to have a payment method set up with payer 104 and is instead an unregistered supplier.

To authenticate the supplier 102, and also to settle its account with supplier 102, payer 104 then sends payment information to the supplier 102. Payer 104 may send payment information to supplier 102 by mail, email (such as over data network 114), etc. Payment information sent to payer 104 includes instructions on how to connect with payment processor 106 via data network 114 to receive payment, such as by using application 200.

Payer 104 sends the first set of specific data elements to the payment processor 106, who has contracted with the payer 104 to process payments for its suppliers 102, via data network 114, such as by using application 200. The first set of specific data elements sent to the payment processor 106 may include the same or different elements that are sent to the supplier 102. For example, if the date of service, the cost, and the authorization number are sent to the payment processor 106, the payer 104 may only have sent the authorization number to the supplier 102 since the supplier already has the date of service and the cost.

At step 304, payment processor 106 receives the first set of specific data elements from the payer 104 via data network 114 on device 110c. For example, payment processor 106 receives the first set of specific data elements and stores the first set of specific data elements on server 112, system memory 118, or both.

At step 305, payment processor 106 receives a second set of specific data elements from the supplier 102 via data network 114 on device 110c. Payment processor 106 receives the second set of specific data elements and stores the second set of specific data elements on server 112, system memory 118, or both. For example, with reference to FIG. 4, supplier 102 enters the second set of specific data elements into a user interface on display 130 of device 110a. The second set of specific data elements may include any combination of the authorization number, the invoice number, the date of purchase/service, and the cost. Supplier 102 may also enter a website security code SC into the user interface.

At step 306, payment processor 106 compares the first set of specific data elements received from the payer 104 at step 304 with the second set of specific data elements received from the supplier 102 at step 305 using device 110c. For example, payment processor 106 checks to see if the date of purchase/service, the authorization number, and the cost from the first set of specific data elements matches the date of purchase/service, the authorization number, and the cost from the second set of specific data elements. Alternatively, the payment processor 106 may only compare two of the date of purchase/service, the authorization number, and the cost. Payment processor 106 may alternatively or additionally compare the invoice numbers from the first and second set of specific data elements. Payment processor 106 may compare any elements of the first set of specific data elements with the respective elements of the second set of specific data elements. For example, if first set of data elements includes fewer elements than the second set of data elements, the elements included in the first set of data elements will only be compared to the respective elements of the second set of data elements.

If, at step 306, payment processor 106 determines that the first set of specific data elements matches at least a portion of the second set of specific data elements, the payment processor 106 generates a single-use number, such as a single-use credit card number at step 307 using device 110c. Payment processor 106 may also generate an expiration date and a credit card security code to correspond to the single-use credit card number using device 110c. The single-use number, along with the expiration date and credit card security code, is usable by the supplier 102 as a credit card number for payment of the goods or services rendered.

Figure 5:
FIG. 5 is an exemplary embodiment of a user interface for a system and method for providing payment to a supplier.

At step 308, payment processor 106 sends the single-use number, along with the expiration date and credit card security code (if generated) to the supplier 102 via data network 114 using device 110c. For example, with reference to FIG. 5, the single-use number, the expiration date, and the credit card security code may be displayed as a virtual card on the user interface on display 130 of device 110a. Alternatively, payment processor 106 may send an email to the supplier 102 with the virtual card via data network 114. The credit card number, the expiration date, and the credit card security code may be sent as plain text or as an image, as shown in FIG. 5. The supplier 102 then uses the single-use number, the expiration date, the credit card security code, and the cost for the goods or services rendered to settle the account with the payer 104.

Alternatively, if, at step 306, payment processor 106 determines that the first set of specific data elements does not match at least a portion of the second set of specific data elements, the payment processor 106 sends a payment denial message to the supplier 102 at step 309.

Figure 6:
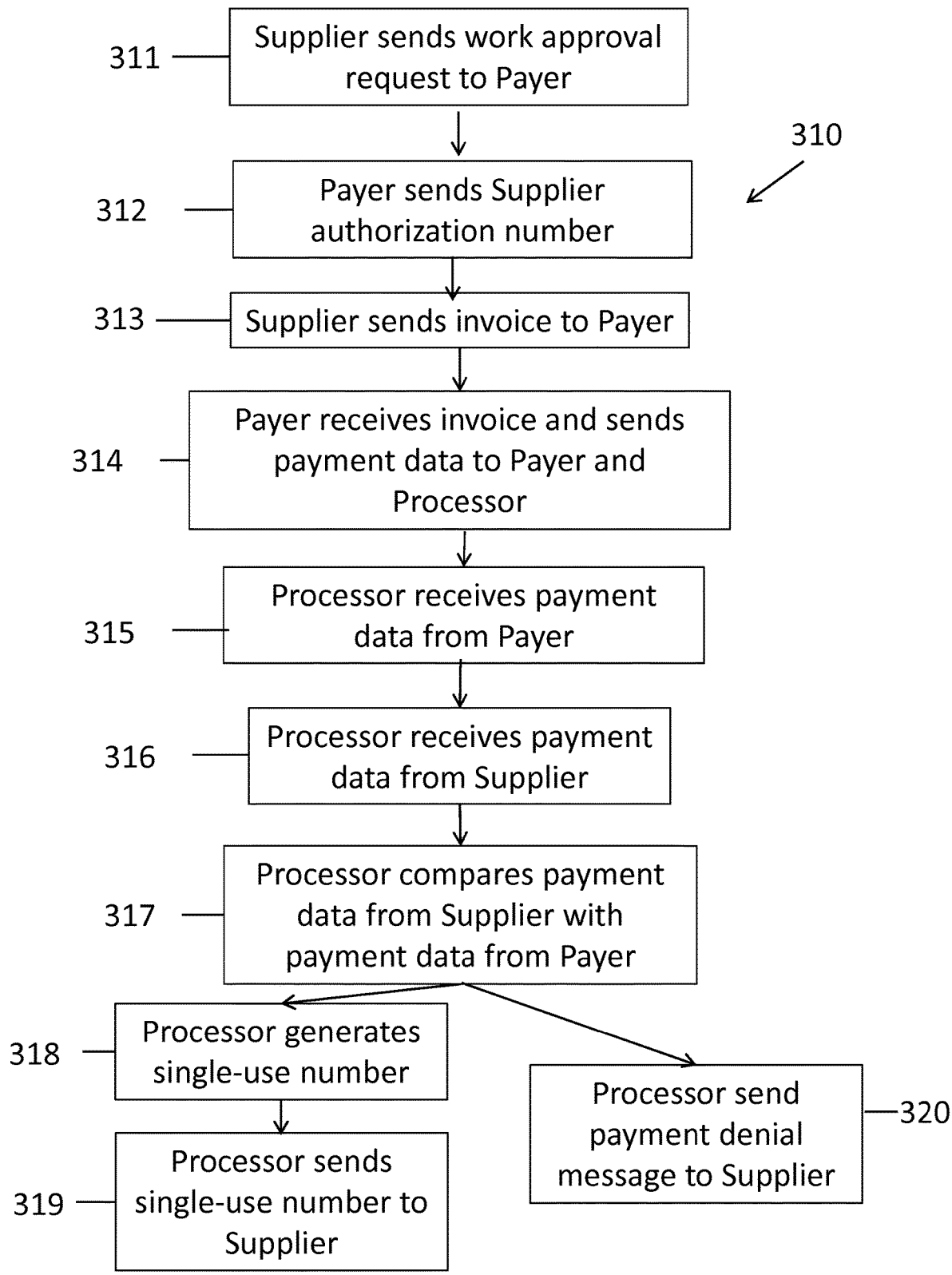
FIG. 6 is a flowchart of a system and method for providing payment to a supplier.
Figure 7:
FIG. 7 is an exemplary embodiment of a user interface for a system and method for providing payment to a supplier.

With reference to FIG. 6, a flow diagram is shown that illustrates an alternative authentication and payment process 310 that includes a work approval step. Alternative authentication and payment process 310 may be used in the car leasing company example described above. Similar to process 300, process 310 may involve a supplier 102 that may be an entity that has never conducted business with payer 104, or who only conducts business with payer 104 on an irregular basis. If supplier 102 has never conducted business with payer 104, or infrequently conducts business with payer 104, the supplier 102 is unlikely to have a payment method set up with payer 104 and is instead an unregistered supplier.

At step 311, supplier 102, such as a car repair shop, sends a work approval request to payer 104, such as a car leasing company. For example, a car lessee's car may require some type of repair or maintenance. The work approval request may include additional information about the car on which the repair or maintenance will be performed, such as a VIN. The work approval request may be sent to the payer using data network 114, by telephone, etc.

At step 312, payer 104, such as a car leasing company, sends supplier 102 approval to proceed. For example, payer 104 may send supplier 102 approval to proceed with the repair or maintenance. Approval from the payer 104 may include an authorization number such as a work approval number that is unique to the services supplier 102 is authorized to render. Alternatively, the authorization number could be a different type of number such as the VIN, an equipment/part serial number, a tax ID, a Duns Number, a Supplier ID, an invoice number, a payment reference Number, a voucher number, a business location ID, a model number, an account number, a provider ID, a claim number, or a vendor ID. Approval may be sent to the payer using data network 114, by telephone, etc. Payer 104 sends supplier 102 the authorization number in a first set of specific data elements that may include any combination the cost (or amount) and/or the VIN (if the VIN is not the authorization number itself).

After the service is rendered, such as repair or maintenance, at step 313, supplier 102 sends an invoice to payer 104 for services rendered. The invoice may include an invoice number generated by the supplier that is unique to the purchase for the goods or services rendered. The invoice may also include the work approval number received from the payer 104 at step 312, a date of service, and the cost. Supplier 102 may send the invoice to a payer 104 by mail, email (such as over data network 114), etc.

At step 314, payer 104 receives the invoice, including the invoice number, from the supplier 102. To authenticate the supplier 102, and also to settle its account with supplier 102, payer 104 then sends payment information to the supplier 102. Payer 104 may send payment information to supplier 102 by mail, email (such as over data network 114), etc. Payment information sent to payer 104 includes instructions on how to connect with payment processor 106 via data network 114 to receive payment, such as by using application 200.

Payer 104 sends the first set of specific data elements to the payment processor 106, who has contracted with the payer 104 to process payments for its suppliers 102, via data network 114, such as by using application 200. The first set of specific data elements sent to the payment processor 106 may include the same or different elements that are sent to the supplier.

At step 315, payment processor 106 receives the first set of specific data elements from the payer 104 via data network 114 on device 110c. For example, payment processor 106 receives the first set of specific data elements and stores the first set of specific data elements on server 112, system memory 118, or both.

At step 316, payment processor 106 receives a second set of specific data elements from the supplier 102 via data network 114 on device 110c. Payment processor 106 receives the second set of specific data elements and stores the second set of specific data elements on server 112, system memory 118, or both. For example, with reference to FIG. 7, supplier 102 enters the second set of specific data elements into a user interface on display 130 of device 110a. The second set of specific data elements may include any combination of the work approval number, the invoice number, the date of service, the cost, the VIN, and/or the authorization number. Supplier 102 may also enter a website security code SC into the user interface.

At step 317, payment processor 106 compares the first set of specific data elements received from the payer 104 at step 315 with the second set of specific data elements received from the supplier 102 at step 316 using device 110c. For example, payment processor 106 checks to see if the VIN, the date of purchase/service, the approval number, and the cost from the first set of specific data elements matches the date of purchase/service, the authorization number, and the cost from the second set of specific data elements. Alternatively, the payment processor 106 may only compare two of the date of purchase/service, the approval number, and the cost. Payment processor 106 may alternatively or additionally compare the invoice numbers and/or the authorization numbers from the first and second set of specific data elements. Payment processor 106 may compare any elements of the first set of specific data elements with the respective elements of the second set of specific data elements. For example, if first set of data elements includes fewer elements than the second set of data elements, the elements included in the first set of data elements will only be compared to the respective elements of the second set of data elements.

Figure 8:
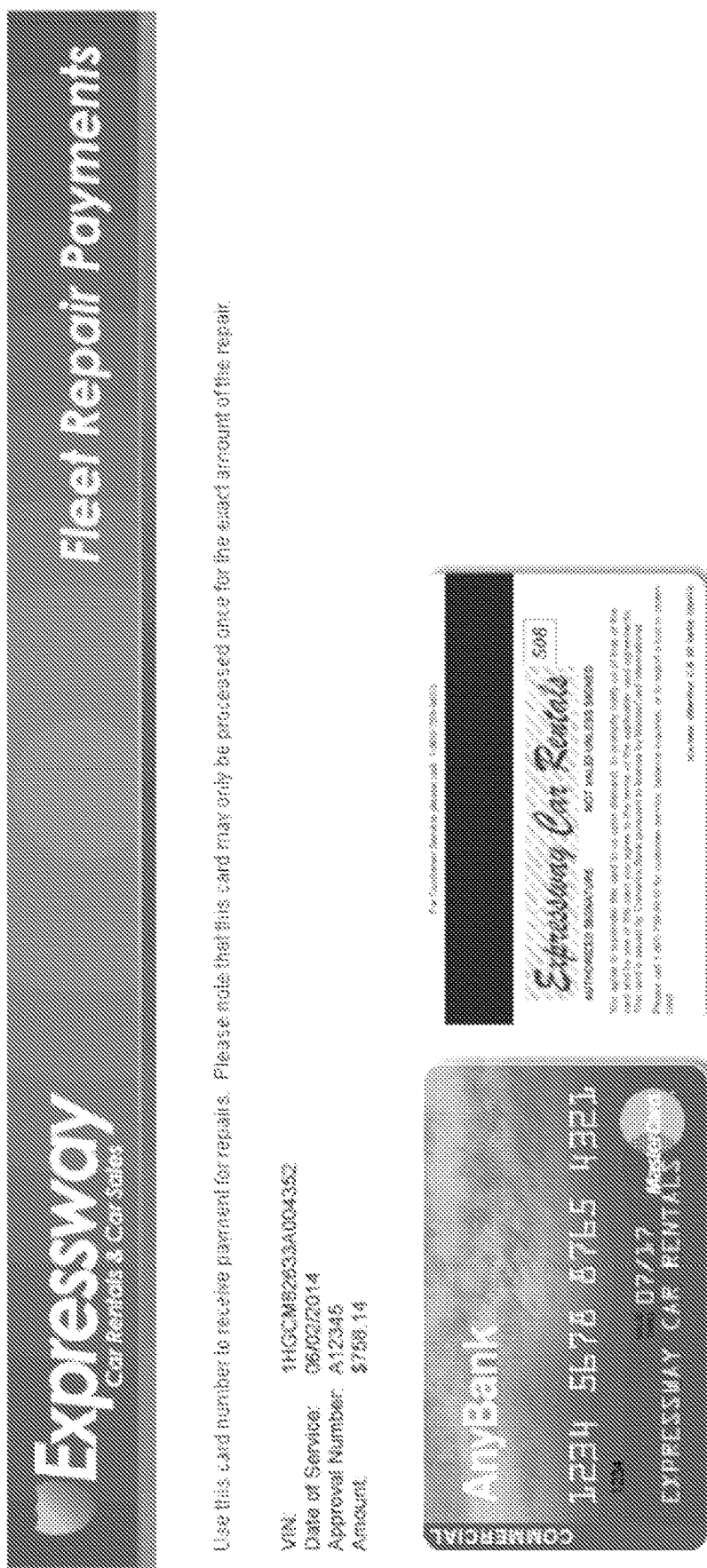
FIG. 8 is an exemplary embodiment of a user interface for a system and method for providing payment to a supplier.

If, at step 317, payment processor 106 determines that the first set of specific data elements matches the second set of specific data elements, the payment processor 106 generates a single-use number, such as a single-use credit card number at step 318 using device 110c. Payment processor 106 may also generate an expiration date and a credit card security code to correspond to the single-use credit card number using device 110c. The credit card number, the expiration date, and the credit card security code may be sent as plain text or as an image, as shown in FIG. 8. The single-use number, along with the expiration date and credit card security code, is usable by the supplier 102 as a credit card number for payment of the goods or services rendered.

At step 319, payment processor 106 sends the single-use number, along with the expiration date and credit card security code (if generated) to the supplier 102 via data network 114 using device 110c. For example, with reference to FIG. 5, the single-use number, the expiration date, and the credit card security code may be displayed as a virtual card on the user interface on display 130 of device 110a. Alternatively, payment processor 106 may send an email to the supplier 102 with the virtual card via data network 114. The supplier 102 then uses the single-use number, the expiration date, the credit card security code, and the cost for the goods or services rendered to settle the account with the payer 104.

Alternatively, if, at step 317, payment processor 106 determines that the first set of specific data elements does not match at least a portion of the second set of specific data elements, the payment processor 106 sends a payment denial message to the supplier 102 at step 320.

As is apparent from the embodiments described herein, all or portions of the various systems, methods, and aspects of the present disclosure may be embodied in hardware, software, or a combination of both. When embodied in software, the systems and methods of the present disclosure, or certain aspects or portions thereof, may be embodied in the form of program code (i.e., computer executable instructions). This program code may be stored on a computer-readable storage medium, such as the various computer-readable storage media described above, wherein, when the program code is loaded into and executed by a machine, such as a computer or server, the machine becomes an apparatus for practicing the disclosure. The program code may be implemented in a high level procedural or object oriented programming language. Alternatively, the program code may be implemented in an assembly or machine language. In any case, the language may be a compiled or interpreted language. When implemented on a general-purpose processor, the program code may combine with the processor to provide a unique apparatus that operates analogously to specific logic circuits.

As the foregoing illustrates, the present disclosure is directed to systems and methods for authenticating and providing payment to suppliers. Changes may be made to the embodiments described above without departing from the broad inventive concepts thereof. Accordingly, the present disclosure is not limited to the particular embodiments disclosed, but is intended to cover all modifications that are within the spirit and scope of the disclosure as defined by the appended claims.

What is claimed:

1. A system for generating a one-time payment method between parties, comprising:
a non-transitory memory storing instructions, and
a hardware processor that executes the instructions to perform the steps of:
receiving a first set of first data elements associated with a transaction from
a payer via a first device, including a transaction amount;
receiving a second set of second data elements associated with a transaction from a payee that is not pre-registered to receive payments via a second device;
determining, based on a comparison of the first set to the second set, that a first data element matches a second data element;
in response to the determining, generating a single-use electronic payment number that is usable as a payment credit card number, the electronic payment number being limited to paying the payee in an amount equal to the transaction amount; and
transmitting the electronic payment number to the payee via the second device over a network.

2. The system of claim 1, wherein the comparison compares at least two first data elements to at least two second data elements.

3. The system of claim 2, wherein the first or second set comprises at least one of: a date of service, an authorization number, or an invoice number.

4. The system of claim 3, wherein the first set comprises an authorization number that is unique to a purchase.

5. The system of claim 4, wherein the second set comprises an invoice number that is unique to the purchase and different from the authorization number.

6. The system of claim 1, wherein the second set is received in response to an input of the second set into a user interface on a display of the second device.

7. The system of claim 6, wherein the second set is received in response to an entry of a website security code into the user interface.

8. The system of claim 1, wherein the first and second sets are received in response to an input at a same application at the first and second devices respectively.

9. The system of claim 8, wherein the application at the first and second devices is implemented with at least one of: a network-based hosted service, a cloud service, Software as a Service (SaaS), Communications as a Service (CaaS), a virtual service, an on-demand service, or a public switched telephone network (PSTN) services.

10. The system of claim 1, wherein the determining comprises determining that at least a portion of the first set does matches at least a portion of the second set and the single-use electronic payment number is transmitted to the second device over the network in response to the determining.

11. The system of claim 10, wherein the single-use electronic payment number is transmitted to display as a virtual card on an interface of the second device.

12. The system of claim 10, wherein the single-use electronic payment number is transmitted within an email.

13. A method for generating a one-time payment method between parties, comprising:
receiving a first set of first data elements associated with a transaction from a payer via a first device, including a transaction amount;
receiving a second set of second data elements associated with a transaction from a payee that is not pre-registered to receive payments via a second device;
determining, based on a comparison of the first set to the second set, that a first data element matches a second data element;
in response to the determining, generating a single-use electronic payment number that is usable as a payment credit card number, the electronic payment number being limited to paying the payee in an amount equal to the transaction amount; and
transmitting the electronic payment number to the payee via the second device over a network.

14. The method of claim 13, wherein the comparison compares at least two first data elements to at least two second data elements.

15. The method of claim 14, wherein the first or second set comprises at least one of: a date of service, an authorization number, or an invoice number.

16. The method of claim 15, wherein the first set comprises an authorization number that is unique to a purchase.

17. The method of claim 15, wherein the second set is received in response to an input of the second set into a user interface on a display of the second device, the input comprising an entry of a website security code into the user interface.

18. The method of claim 13, wherein the determining comprises determining that at least a portion of the first set does matches at least a portion of the second set and the single-use electronic payment number is transmitted to the second device over the network in response to the determining.

* * * * *